United States Patent
Okazaki et al.

(10) Patent No.: US 9,970,356 B2
(45) Date of Patent: May 15, 2018

(54) ATOMIZER, COMBUSTION DEVICE INCLUDING ATOMIZER, AND GAS TURBINE PLANT

(71) Applicant: Mitsubishi Hitachi Power Systems, Ltd., Yokohama (JP)

(72) Inventors: Hirofumi Okazaki, Yokohama (JP); Akihito Orii, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 224 days.

(21) Appl. No.: 14/736,785

(22) Filed: Jun. 11, 2015

(65) Prior Publication Data

US 2015/0361895 A1    Dec. 17, 2015

(30) Foreign Application Priority Data

Jun. 12, 2014    (JP) .................. 2014-121071

(51) Int. Cl.
*F02C 7/22*    (2006.01)
*F23R 3/28*    (2006.01)
(Continued)

(52) U.S. Cl.
CPC .................. *F02C 7/22* (2013.01); *F02C 3/30* (2013.01); *F02C 7/222* (2013.01); *F23D 11/102* (2013.01);
(Continued)

(58) Field of Classification Search
CPC .... F02C 7/22; F02C 7/222; F02C 3/30; F23D 11/102; F23D 11/38; F23R 3/28; F23R 3/286; F23R 3/30
See application file for complete search history.

(56) References Cited

U.S. PATENT DOCUMENTS 4,601,428 A    7/1986    Kurogo
4,614,490 A *  9/1986    Kiczek .................. F23D 11/007
                                              239/431
(Continued)

FOREIGN PATENT DOCUMENTS

EP    2 664 848 A1    11/2013
EP    2 881 662 A1    6/2015
(Continued)

OTHER PUBLICATIONS

Extended European Search Report issued in counterpart European Application No. 15171768.3 dated Oct. 22, 2015 (eleven (11) pages).

(Continued)

*Primary Examiner* — Steven Sutherland
(74) *Attorney, Agent, or Firm* — Crowell & Moring LLP

(57) ABSTRACT

An atomizer of the invention includes a mixing chamber, spray fluid flow passages supplying a spray fluid to the mixing chamber, a spray medium flow passage supplying a spray medium to the mixing chamber, outlet holes spraying a fluid mixture of the spray fluid and the spray medium, and fluid mixture flow passages connecting the mixing chamber and the outlet holes to each other. The fluid mixture flowing through each of the fluid mixture flow passages joins with each other at a joining section and is sprayed from the outlet hole. The mixing chamber includes a middle ejection hole spraying the spray fluid to the mixing chamber. The middle ejection hole is arranged at a joining section of the spray fluid flow passages. The spray fluid flowing through the spray fluid flow passages joins with each other at the joining section and is sprayed from the middle ejection hole.

10 Claims, 12 Drawing Sheets

(51) Int. Cl.
    *F02C 3/30*     (2006.01)
    *F23R 3/30*     (2006.01)
    *F23D 11/10*     (2006.01)
    *F23D 11/38*     (2006.01)

(52) U.S. Cl.
    CPC ............... *F23D 11/38* (2013.01); *F23R 3/28* (2013.01); *F23R 3/286* (2013.01); *F23R 3/30* (2013.01)

(56) References Cited

U.S. PATENT DOCUMENTS

| | | | | |
|---|---|---|---|---|
| 4,699,587 A * | 10/1987 | Shimoda | ................. | F23D 1/005 239/427 |
| 4,890,793 A * | 1/1990 | Fuglistaller | ........... | B05B 7/0458 239/290 |
| 5,277,023 A * | 1/1994 | Bradley | ................. | F02B 77/04 239/119 |
| 6,425,755 B1 | 7/2002 | Pillard et al. | | |
| 6,547,163 B1 * | 4/2003 | Mansour | ............... | B05B 1/3405 239/404 |
| 7,674,449 B2 * | 3/2010 | Randolph, III | .......... | B01J 4/002 423/522 |
| 7,828,227 B2 * | 11/2010 | Brown | ................. | B05B 7/0466 239/416.5 |
| 2004/0061001 A1 * | 4/2004 | Mao | ........................ | B05B 7/08 239/398 |
| 2013/0319301 A1 | 12/2013 | Okazaki et al. | | |

FOREIGN PATENT DOCUMENTS

| | | |
|---|---|---|
| JP | 50-055926 U1 | 9/1973 |
| JP | 60-126511 A | 7/1985 |
| JP | 62-186112 A | 8/1987 |
| JP | 63-049613 A | 3/1988 |
| JP | 63-049614 A | 3/1988 |
| JP | 01-127067 A | 5/1989 |
| JP | 9-239299 A | 9/1997 |
| JP | 09-287714 A | 11/1997 |
| JP | 2012-145026 A | 8/2012 |
| JP | 2013-177998 A | 9/2013 |
| JP | 2014-031990 A | 2/2014 |
| JP | 2014-035126 A | 2/2014 |
| WO | WO 2014/024813 A1 | 2/2014 |

OTHER PUBLICATIONS

Japanese-language Office Action issued in counterpart Japanese Application No. 2014-121071 dated Sep. 19, 2017 with English translation (Seven (7) pages).

* cited by examiner

ATOMIZER, COMBUSTION DEVICE INCLUDING ATOMIZER, AND GAS TURBINE PLANT

CLAIM OF PRIORITY

The present application claims priority from Japanese Patent Application JP 2014-121071 filed on Jun. 12, 2014, the content of which is hereby incorporated by reference into this application.

FIELD OF THE INVENTION

The present invention relates to an atomizer and a combustion device including the atomizer, and relates more specifically to an atomizer of a twin-fluid atomization method which atomizes liquid fuel (spray fluid) using gas (spray medium) and a combustion device including the atomizer.

BACKGROUND OF THE INVENTION

In the combustion device such as a combustor of a gas turbine, it is required to achieve both of diversification of fuel allowing to cope with various kinds of fuel and improvement of environmental performance.

With respect to diversification of fuel, in a part of the gas turbines, a so-called dual fuel combustor is employed which uses a liquid fuel such as light oil and heavy oil A in addition to fuel gas represented by natural gas according to the supply condition of the fuel. In this combustor, because both of a gas fuel and a liquid fuel can be used, operation can be continued even when the supply condition of the fuel changes.

With respect to improvement of the environmental performance of a gas turbine, reduction is required of nitrogen oxide (NOx), carbon monoxide (CO), and particulate matters discharged mainly by combustion. With respect to reduction of nitrogen oxide, development is underway mainly for reduction of thermal NOx generated by oxidation of nitrogen in the air at a high temperature. For reduction of thermal NOx, application of the lean premixed combustion method is effective in which combustion is performed after excessive air is mixed to the fuel beforehand. According to this combustion method, the ratio of the fuel and air in the combustion space becomes constant, the air volume is so much that localized high temperature field is not formed, and then formation of thermal NOx can be suppressed. On the other hand, because the rate of the air to the fuel is high, stable combustion range is limited. Also, when the combustion temperature is low, CO and particulate matters are liable to be generated as unburnt carbon.

Even when a liquid fuel is used for a gas turbine combustor, application of the lean premixed combustion method is preferable for reduction of nitrogen oxide. In the case of the liquid fuel, for the purpose of lean premixed combustion, it is necessary that the fuel component of the liquid state is vaporized beforehand and is mixed with air before combustion. At this time, when the liquid fuel is atomized, the surface area per weight of the liquid fuel increases and vaporization is performed easily. Further, also in the case the liquid fuel is combusted without vaporization by atomizing the liquid fuel, combustion reaction becomes quick because the surface area per weight increases. Therefore, unburnt carbon is hardly generated, and the amount of CO and particulate matters generated from the combustion device can be reduced. Thus, in combustion of a liquid fuel, atomization is one of the important factors for improvement of the environmental performance.

As one of the atomizers to atomize a liquid fuel, there is a twin-fluid atomization method in which a liquid fuel (spray fluid) and gas such as air and steam (spray medium for atomization) are supplied, mixed with each other, and thereby atomized. In general, the twin-fluid atomization method has higher atomization performance in spraying of a large volume compared with a pressure atomization method of atomizing a spray fluid without using a spray medium. Also in the twin-fluid atomization method, even when the supply amount of the liquid fuel may change, variation in atomizing performance is small. Therefore, the twin-fluid atomization method is generally used for a combustion device in which the combustion load changes.

In an atomizer of the twin-fluid atomization method (hereinafter referred to simply as "atomizer"), it is required to improve the atomization performance, to reduce the used amount and the pressure of the spray medium, and to reduce the energy usage required for spraying. Therefore, the mixing method of the spray medium has been studied.

JP-A 62-186112 discloses an example of the atomizer of an inside mixing method in which the spray fluid and the spray medium are mixed in a space (mixing chamber) on the upstream side, and the fluid after mixing (hereinafter referred to as "fluid mixture") is ejected from a plurality of outlet holes. In the atomizer described in JP-A 62-186112, mixing advances because the flow directions of the spray fluid and the spray medium change in the mixing chamber, and then the spray fluid is atomized. The atomization of the spray fluid advances because the fluid mixture is ejected from the outlet holes at a high speed, generating speed difference against the ambient gas and applying a shear force to the spray fluid in the fluid mixture.

JP-A 9-239299 discloses an atomizer in which the fluid mixtures of the spray fluid and the spray medium are made to flow to oppose each other and to collide with each other in the vicinity of an outlet hole, and thereby atomization of the spray fluid is promoted. The atomizer as described in JP-A 9-239299, in which the fluid mixture is ejected in a fan-shape from the outlet hole, is also called a fan spray type atomizer because of the spraying shape. In the fan spray type atomizer, in addition to an effect that the spray fluid is mixed with the spray medium and is atomized, the fluid mixture is ejected in a fan-shape from the outlet hole, therefore the interface of the fluid mixture and the ambient gas is so much that a shear force is applied to the spray fluid in the fluid mixture by the speed difference against the ambient gas, and atomization of the spray fluid advances.

The twin-fluid atomizer disclosed in JP-A 62-186112 mixes the spray fluid and the spray medium in the mixing chamber, and ejects the fluid mixture from a plurality of outlet holes. Atomization is executed mainly by mixing by stirring (stirring mixing) in the mixing chamber and by a shear force caused by the speed difference against the ambient gas generated when the fluid mixture is ejected from the outlet holes at a high speed. However, the spray fluid and the spray medium are liable to be separated because of the difference in density. Particularly, in the mixing chamber where the volume is large and the flow speed of the fluid mixture drops, the spray fluid and the spray medium are separated at a portion with low flow speed, and local variance of the mixing ratio of the spray fluid and the spray medium is liable to become large. In this case, there is a problem that stirring mixing in the mixing chamber does not advance, and atomization does not advance. Further, there is also a problem that, when the spray fluid and the spray medium are made to collide on the wall surface on the downstream side of the mixing chamber to promote stirring mixing, the solid portion (coarse particles) in the spray fluid collides on the wall surface, thereby the wall surface is worn, and the frequency of exchange of the atomizer increases.

The twin-fluid atomizer disclosed in JP-A 9-239299 mixes the spray fluid and the spray medium in a plurality of mixing sections. However, there is a problem that, because the fluid mixture flows at a high speed, the mixing time inside the flow passage is short in general, and therefore mixing does not advance sufficiently. Further, there is also a problem that, because the flow passage of the spray fluid connected from the upstream side and the flow passage of the spray medium cross with each other at the mixing section, the solid portion in the spray fluid collides on the wall surface of the mixing chamber, and thereby the wall surface is liable to be worn.

The object of the present invention is to provide an atomizer capable of promoting atomization of the spray fluid and capable of suppressing the wear caused by the solid portion in the spray fluid, and to provide a combustion device including the atomizer.

SUMMARY OF THE INVENTION

The atomizer, the combustion device including the atomizer, and the gas turbine plant of the present invention have the features as described below.

An atomizer comprising a mixing chamber that forms a fluid mixture by mixing a spray fluid as fuel and a spray medium as gas for atomizing the spray fluid; a pair of spray fluid flow passages that supplies the spray fluid to the mixing chamber; a spray medium flow passage that supplies the spray medium to the mixing chamber; and one or more outlet holes that spray the fluid mixture to the outside. The mixing chamber includes at least one middle ejection hole that sprays the spray fluid to the mixing chamber. A pair of the spray fluid flow passages is connected to each other on a downstream side of a flow of the spray fluid. The middle ejection hole is arranged at a joining section where a pair of the spray fluid flow passages is connected to each other. The spray fluid that flows through a pair of the spray fluid flow passages joins with each other at the joining section of the spray fluid flow passages, and is sprayed from the middle ejection hole.

According to the present invention, an atomizer capable of promoting atomization of the spray fluid and capable of suppressing the wear caused by the solid portion in the spray fluid can be provided, and a combustion device including the atomizer can be provided.

DETAILED DESCRIPTION OF THE PREFERRED EMBODIMENTS

Figure 1:
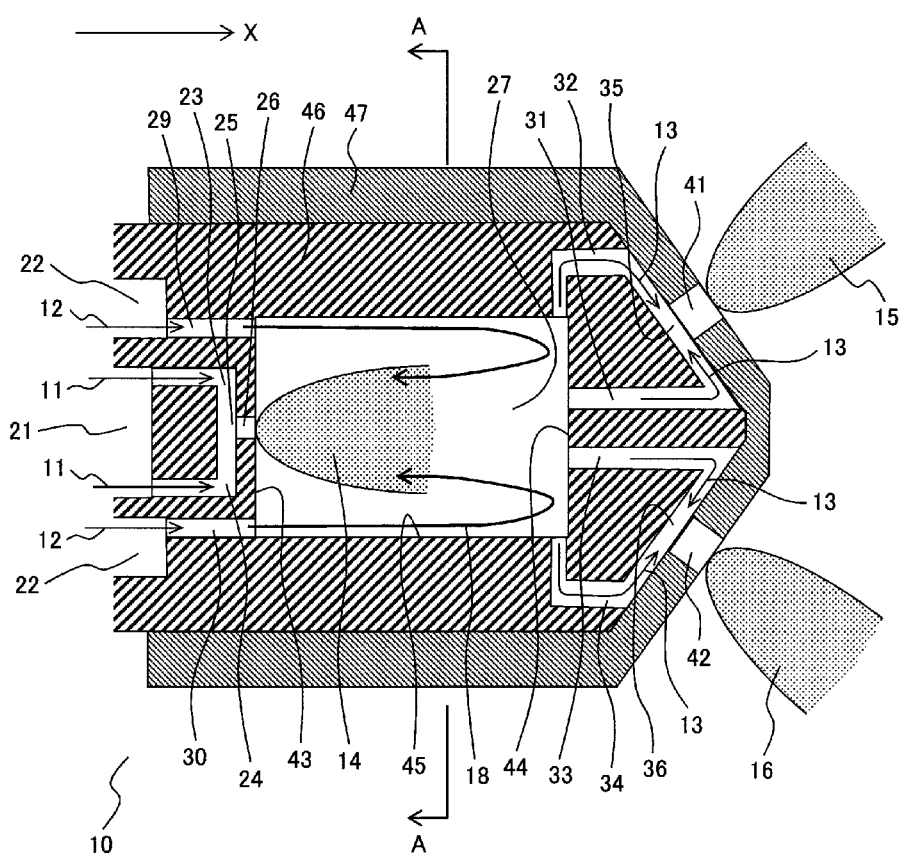
FIG. 1 is a cross-sectional view of a front end section of an atomizer according to the first embodiment of the present invention along the axial direction.

An atomizer, a combusting device including the atomizer, and a gas turbine plant according to embodiments of the present invention will be explained using the drawings. Note that, in the drawings used in the specification, a same reference sign is given to a same element, and repeated explanation may be omitted with respect to such an element. In the embodiments described below, "spray fluid" is fuel (particularly a liquid fuel), and "spray medium" is gas for atomizing the spray fluid. Also, "upstream" and "downstream" respectively mean upstream and downstream with respect to the flow of the spray fluid and the fluid mixture.

First Embodiment

An atomizer 10 according to the first embodiment of the present invention will be explained with reference to FIGS. 1-8.

Figure 2:
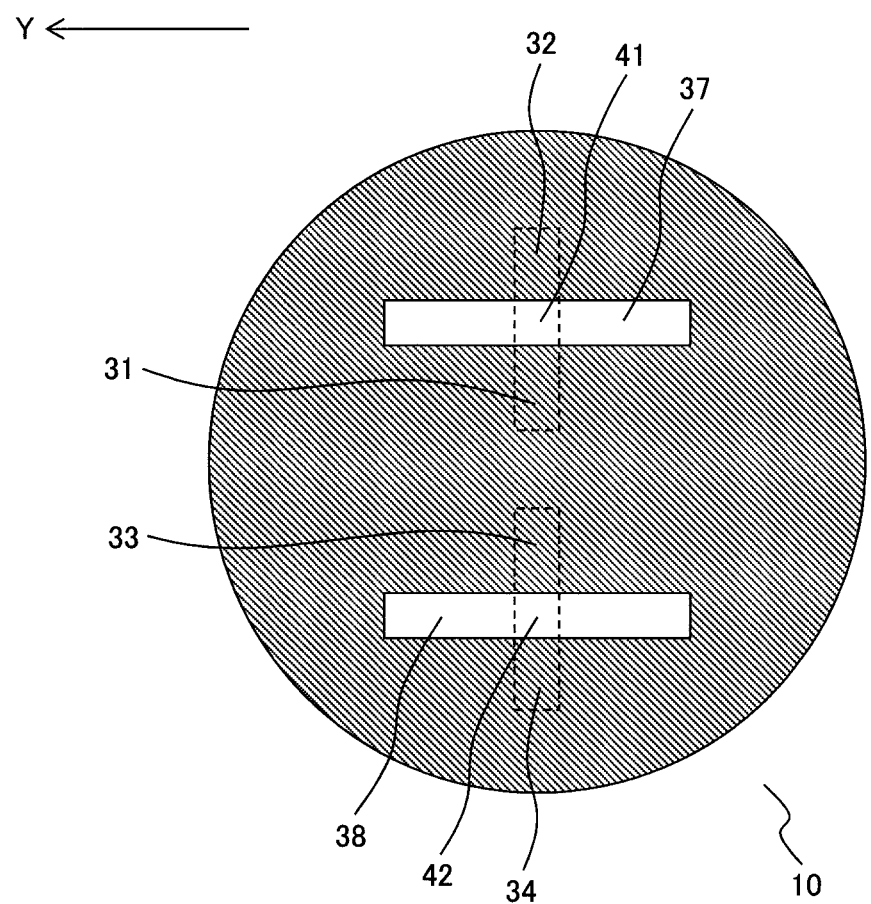
FIG. 2 is a front view when the atomizer of FIG. 1 is viewed from the downstream side of the supply direction of the spray fluid.
Figure 3:
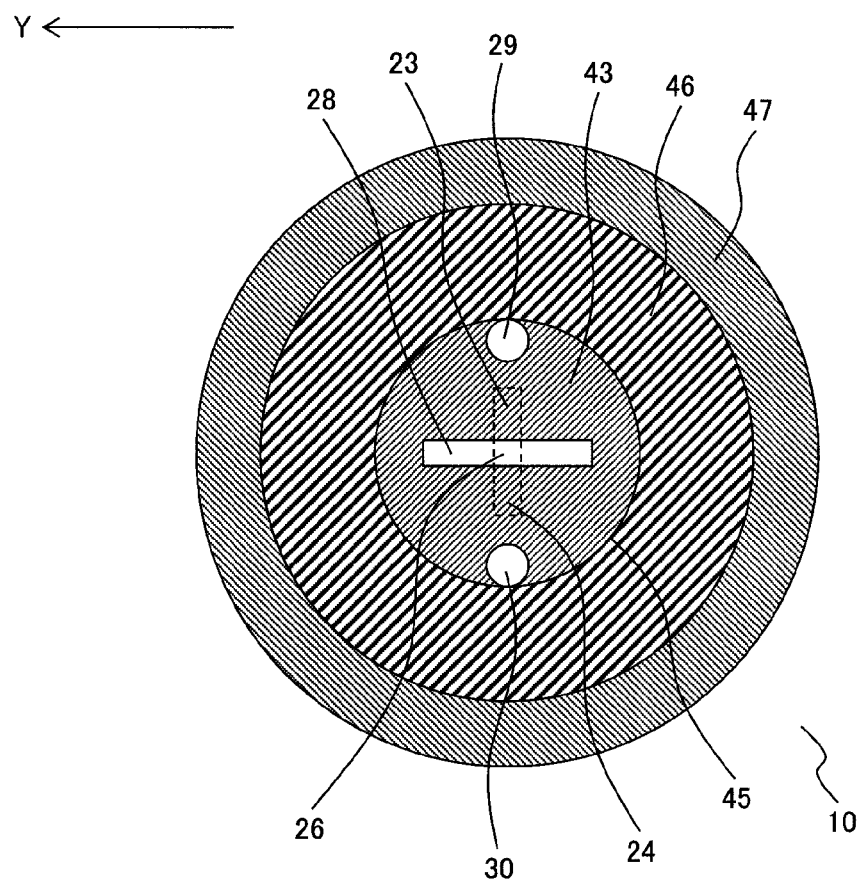
FIG. 3 is a cross-sectional view of the atomizer taken along the cut line A-A of FIG. 1.

FIG. 1 is a cross-sectional view of a front end section of the atomizer 10 according to the present embodiment along the axial direction (X-direction). In FIG. 1, X-direction is the axial direction of the atomizer 10 and is the supply direction of the spray fluid. FIG. 2 is a front view when the atomizer 10 of FIG. 1 is viewed from the downstream side of the supply direction of the spray fluid. FIG. 3 is a cross-sectional view of the atomizer 10 taken along the cut line A-A of FIG. 1 and is a cross-sectional view of the atomizer 10 as viewed from the downstream side of the supply direction of the spray fluid at a position of a mixing chamber 27 of the atomizer 10. In FIGS. 2, 3, Y-direction is the radial direction of the atomizer 10.

Figure 4:
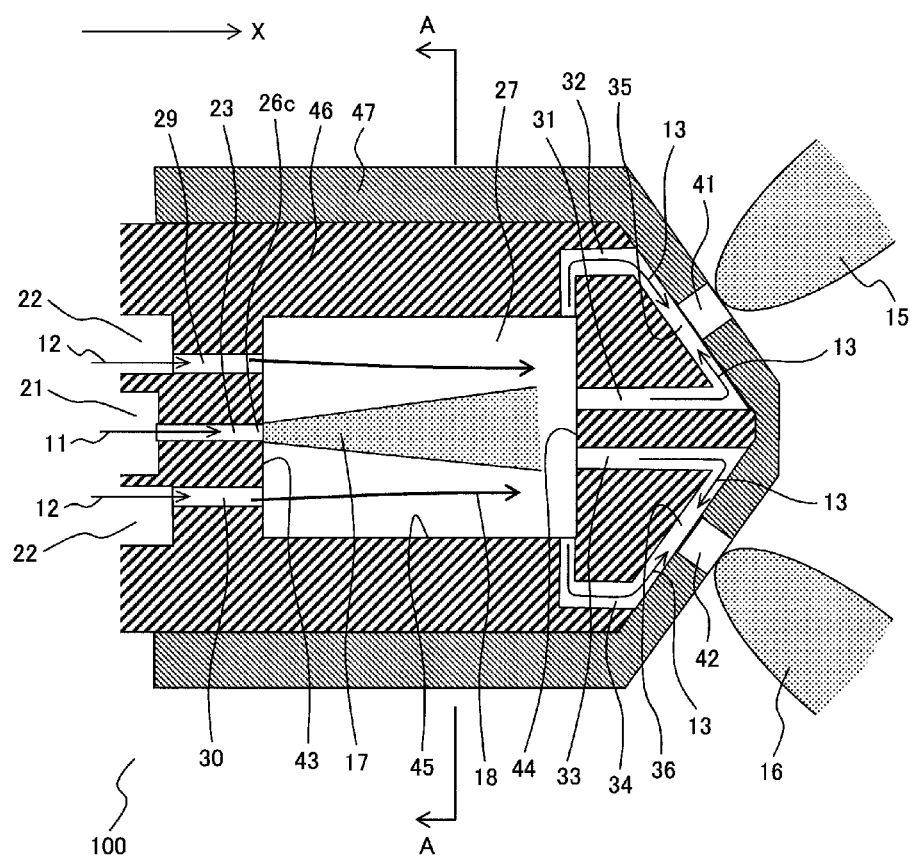
FIG. 4 is a cross-sectional view of a front end section of an atomizer according to a conventional art along the axial direction.

FIG. 4 is a cross-sectional view of a front end section of an atomizer 100 according to a conventional art along the axial direction (X-direction), and shows the difference from the atomizer 10 according to the present embodiment.

Figure 5:
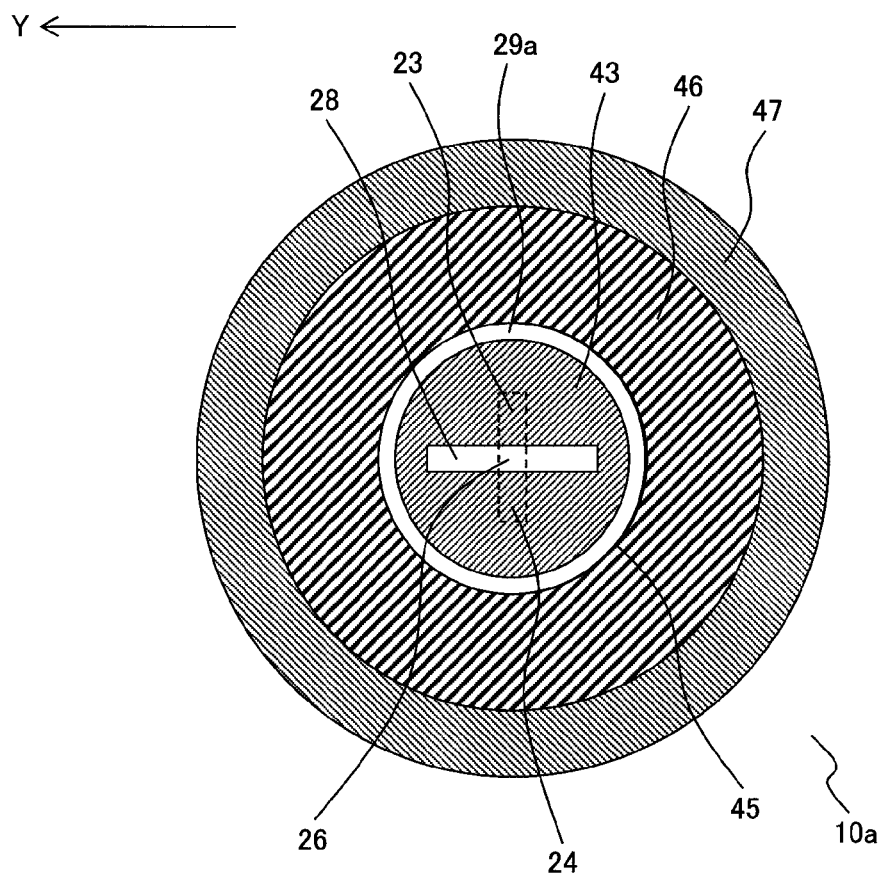
FIG. 5 is a cross-sectional view at a position corresponding to the cut line A-A of FIG. 1 with respect to an atomizer according to a modification of the first embodiment of the present invention.
Figure 6:
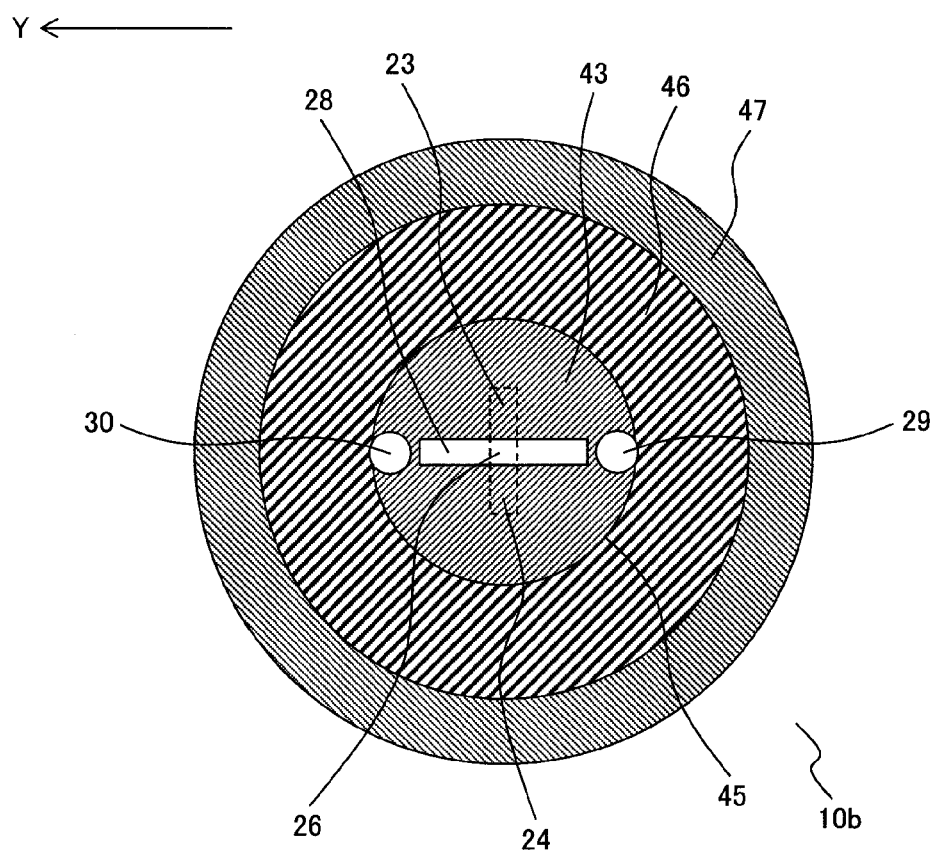
FIG. 6 is a cross-sectional view at a position corresponding to the cut line A-A of FIG. 1 with respect to an atomizer according to another modification of the first embodiment of the present invention.
Figure 7:
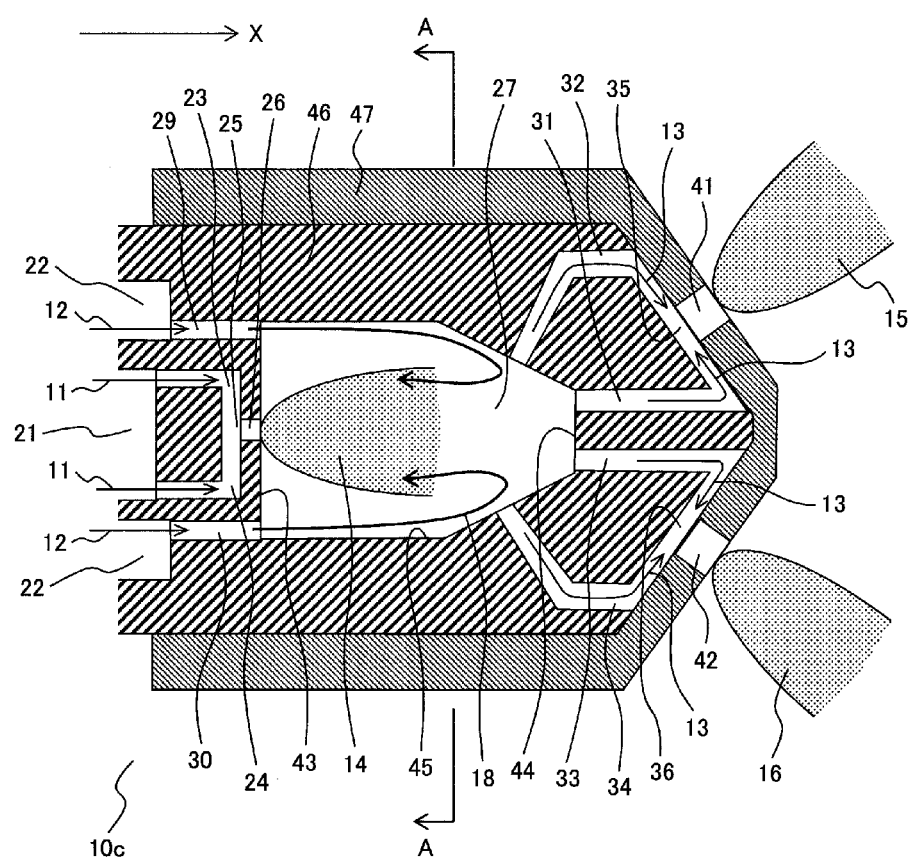
FIG. 7 is a cross-sectional view of a front end section along the axial direction with respect to an atomizer according to another modification of the first embodiment of the present invention.
Figure 8:
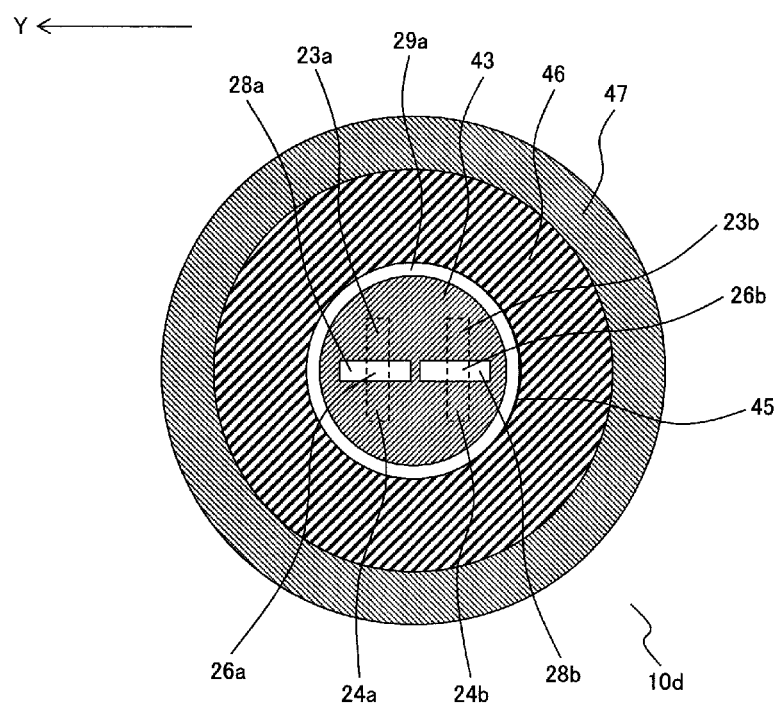
FIG. 8 is a cross-sectional view at a position corresponding to the cut line A-A of FIG. 1 with respect to an atomizer according to another modification of the first embodiment of the present invention.

FIG. 5 is a cross-sectional view at a position corresponding to the cut line A-A of FIG. 1 with respect to an atomizer 10a according to a modification of the present embodiment. FIG. 6 is a cross-sectional view at a position corresponding to the cut line A-A of FIG. 1 with respect to an atomizer 10b according to another modification of the present embodiment. FIG. 7 is a cross-sectional view of a front end section along the axial direction (X-direction) with respect to an atomizer 10c according to another modification of the present embodiment. FIG. 8 is a cross-sectional view at a position corresponding to the cut line A-A of FIG. 1 with respect to an atomizer 10d according to another modification of the present embodiment.

The atomizer 10 of the present embodiment shown in FIGS. 1-3 includes an atomizer inner tube 46 and an atomizer outer tube 47 that is positioned in the outer periphery of the atomizer inner tube 46, wherein a liquid fuel is pressurized and supplied as a spray fluid 11, and gas different from the spray fluid 11 is pressurized and supplied as a spray medium 12. The mixing chamber 27 is formed inside the atomizer inner tube 46, and outlet holes 41, 42 are formed in the atomizer outer tube 47. The atomizer 10 mixes the spray fluid 11 and the spray medium 12 in the mixing chamber 27 to form fluid mixture 13, and sprays the fluid mixture 13 to the outside from the outlet holes 41, 42 arranged at the front end section of the atomizer 10. In other words, the atomizer 10 of the present embodiment is one of the twin-fluid atomizers that atomize the spray fluid 11 (liquid fuel) using the spray medium 12.

On the most upstream side of the atomizer 10, a spray fluid supply flow passage 21 through which the spray fluid 11 flows and a spray medium supply flow passage 22 through which the spray medium 12 flows are arranged. The spray fluid supply flow passage 21 is branched into two flow passages of a pair of spray fluid flow passages 23, 24, and makes the spray fluid 11 flow to the downstream side. The spray medium supply flow passage 22 has an annular shape at a cross section perpendicular to the axis of the atomizer 10, is branched into two flow passages of spray medium flow passages 29, 30, and makes the spray medium 12 flow to the downstream side. The spray medium flow passages 29, 30 connect the spray medium supply flow passage 22 and the mixing chamber 27 to each other. The spray fluid 11 is a liquid fuel such as light oil and heavy oil A. Pressurized air and steam are generally used for the spray medium 12.

The mixing chamber 27 is a space formed by being surrounded by an upstream side partition wall 43, a downstream side partition wall 44, and a side partition wall 45, is supplied with the spray fluid 11 and the spray medium 12 to form the fluid mixture 13, and makes the fluid mixture 13 flow out toward the outlet holes 41, 42. The upstream side partition wall 43 is positioned on the upstream side of the flow of the spray fluid 11 and inside of the atomizer inner tube 46. The downstream side partition wall 44 is an inner wall of the atomizer inner tube 46, is positioned on the downstream side of the flow of the spray fluid 11, and opposes the upstream side partition wall 43. The side partition wall 45 is an inner wall of the atomizer inner tube 46, and is a wall surface extending along the axial direction (X-direction) of the atomizer 10 (namely, along the flow of the spray fluid 11). A pair of fluid mixture flow passages 31, 32 and a pair of fluid mixture flow passages 33, 34 are connected to the mixing chamber 27, and the fluid mixture 13 formed in the mixing chamber 27 dividedly flows through the mixture flow passages 31-34. The fluid mixture flow passages 31, 33 include openings connected to the mixing chamber 27 in the downstream side partition wall 44. The fluid mixture flow passages 32, 34 include openings connected to the mixing chamber 27 in the side partition wall 45.

Below, the flow of the spray fluid 11 and the spray medium 12 will be explained from the upstream side of the atomizer 10 to the outlet holes 41, 42.

The spray fluid 11 flows through a pair of the spray fluid flow passages 23, 24 that branches from the spray fluid supply flow passage 21. The spray fluid flow passages 23, 24 are connected to each other at a joining section 25 located on the downstream side, and are flow passages that allow the spray fluid 11 flowing through the spray fluid flow passages 23, 24 to flow down. The spray fluid 11 flowing through the spray fluid flow passages 23, 24 flows toward the joining section 25, joins with (collides on) each other at the joining section 25, and is sprayed as spray 14 into the mixing chamber 27 from a middle ejection hole 26 arranged to be positioned at the joining section 25. The middle ejection hole 26 is arranged in the center of the upstream side partition wall 43 of the mixing chamber 27.

As shown in FIG. 3, in the upstream side partition wall 43 of the mixing chamber 27, a groove 28 is arranged to extend in the direction perpendicular to the direction along which the spray fluid flow passages 23, 24 are connected to each other (to extend in the horizontal direction of FIG. 3). The joining section 25 shown in FIG. 1 (not shown in FIG. 3) is combined with the groove 28, and the communication section of the joining section 25 and the groove 28 is the middle ejection hole 26. The groove 28 plays a role of widening the spray fluid 11 having flowed through the spray fluid flow passage 23 and the spray fluid 11 having flowed through the spray fluid flow passage 24, which have joined with (collided on) each other at the joining section 25, in the direction (the horizontal direction of FIG. 3) perpendicular to the joining direction (the connecting direction of the spray fluid flow passage 23 and the spray fluid flow passage 24, namely the vertical direction of FIG. 3), and spraying them.

On the other hand, as shown in FIG. 1, the spray medium 12 passes through the spray medium flow passages 29, 30 from the spray medium supply flow passage 22, is supplied from the outlets of the spray medium flow passages 29, 30 to the mixing chamber 27, and flows as a flow 18. The outlets of the spray medium flow passages 29, 30 are arranged in the upstream side partition wall 43 of the mixing chamber 27, and open toward the mixing chamber 27. The spray medium 12 is mixed with the spray fluid 11 in the mixing chamber 27.

The spray fluid 11 becomes the spray 14 flat and of fan shape which is thin in the connection direction of the spray fluid flow passages 23, 24 and is widened in the direction (the extending direction of the groove 28) perpendicular to this connection direction, when flowing from the middle ejection hole 26 into the mixing chamber 27. In the boundary part of the spray 14 of the fan shape with the ambient gas in the mixing chamber, a shear force is applied to the spray fluid 11 due to the flow speed difference against the ambient gas, and the spray fluid 11 is atomized. Also, because the spray fluid 11 is mixed with the spray medium 12, a shear force is applied to the spray fluid 11 due to the flow speed difference between the spray fluid 11 and the spray medium 12, and then the spray fluid 11 is atomized.

The fluid mixture 13 of the spray fluid 11 and the spray medium 12 having been mixed in the mixing chamber 27 dividedly flows through the fluid mixture flow passages 31-34 on the downstream side of the atomizer 10 from the mixing chamber 27. As shown in FIGS. 1, 2, in the atomizer 10, a pair of the fluid mixture flow passage 31 and the fluid mixture flow passage 32 is connected to each other at a joining section 35 located on the downstream side, and the fluid mixture 13 is sprayed to the outside of the atomizer 10 through the outlet hole 41 arranged to be positioned at the joining section 35. A pair of the fluid mixture flow passage 33 and the fluid mixture flow passage 34 is connected to each other at a joining section 36 located on the downstream side, and the fluid mixture 13 is sprayed to the outside of the atomizer 10 through the outlet hole 42 arranged at the joining section 36.

As shown in FIG. 2, in the atomizer 10, a groove 37 is arranged to extend in the direction perpendicular to the direction along which the fluid mixture flow passages 31, 32 are connected to each other (to extend in the horizontal direction of FIG. 2), and a groove 38 is arranged to extend in the direction perpendicular to the direction along which the fluid mixture flow passages 33, 34 are connected to each other. The joining sections 35, 36 shown in FIG. 1 (not shown in FIG. 2) are combined to the groves 37, 38, respectively, the communication section of the joining section 35 and the groove 37 is the outlet hole 41, and the communication section of the joining section 36 and the groove 38 is the outlet hole 42. The groove 37 plays a role of widening the fluid mixture 13 having flowed through the fluid mixture flow passages 31, 32 and having joined with (collided on) each other at the joining section 35 in the direction (the horizontal direction of FIG. 2) perpendicular to the joining direction (the connecting direction of the fluid mixture flow passage 31 and the fluid mixture flow passage 32, namely the vertical direction of FIG. 2), and ejecting the fluid mixture 13. The groove 38 plays a role of widening the fluid mixture 13 having flowed through the fluid mixture flow passages 33, 34 and having joined with (collided on) each other at the joining section 36 in the direction (the horizontal direction of FIG. 2) perpendicular to the joining direction (the connecting direction of the fluid mixture flow passage 33 and the fluid mixture flow passage 34, namely the vertical direction of FIG. 2), and ejecting the fluid mixture 13.

The fluid mixture 13 becomes spray 15 flat and of fan shape which is thin in the connection direction of the fluid mixture flow passages 31, 32 and is widened in the direction (the extending direction of the groove 37) perpendicular to this connection direction when ejected from the outlet hole 41 to the outside of the atomizer 10. Also, the fluid mixture 13 becomes spray 16 flat and of fan shape which is thin in the connection direction of the fluid mixture flow passages 33, 34 and is widened in the direction (the extending direction of the groove 38) perpendicular to this connection direction when ejected from the outlet hole 42 to the outside of the atomizer 10. In the boundary part of the spray 15, 16 of the fan shape with the gas outside the atomizer 10, a shear force is applied to the spray fluid 11 within the fluid mixture 13 due to the flow speed difference against the gas outside the atomizer 10, and the spray fluid 11 is atomized.

In the atomizer 10 according to the present embodiment, atomization of the spray fluid 11 advances mainly by the effects shown in the items (A)-(E) below.
(A) Atomization by the flow speed difference between the spray 14 of fan shape and the gas inside the mixing chamber 27 when the spray fluid 11 flows from the middle ejection hole 26 into the mixing chamber 27.
(B) Mixing of the spray fluid 11 and the spray medium 12 in the mixing chamber 27.
(C) Mixing of the spray fluid 11 and the spray medium 12 in the fluid mixture flow passages 31-34 branched from the mixing chamber 27.
(D) Mixing of the spray fluid 11 and the spray medium 12 by collision of the fluid mixture 13 at the joining sections 35, 36.
(E) Atomization by the flow speed difference between the spray 15, 16 of the fan shape and the gas outside the atomizer 10 when the fluid mixture 13 is sprayed from the outlet holes 41, 42 to the outside of the atomizer 10.

The item (A) shows an effect that atomization mainly of the spray fluid 11 advances by the momentum of the spray fluid 11 when the spray fluid 11 is sprayed into the mixing chamber 27. The item (B) shows an effect that atomization mainly of the spray fluid 11 advances by the momentum of the spray medium 12 when the spray medium 12 is sprayed into the mixing chamber 27. In both cases, a shear force is applied to the surface of the spray fluid 11 due to the flow speed difference between the spray fluid 11 and the surrounding gas (including the spray medium 12), and then atomization of the spray fluid 11 advances. Note that, when the mixing chamber 27 has a shape long in the axial direction of the atomizer 10 and the flow speed of the fluid mixture 13 of the spray fluid 11 and the spray medium 12 drops inside the mixing chamber 27, integration of the particles of the spray fluid 11 may advance due to the surface tension of the spray fluid 11, and therefore the particle size of the spray fluid 11 in the fluid mixture 13 may become large.

The items (C) and (D) show an effect that atomization of the spray fluid 11 advances by mixing of the spray fluid 11 and the spray medium 12 within the fluid mixture flow passages 31-34. When the flow speed of the fluid mixture 13 changes, the spray fluid 11 and the spray medium 12 get to have different inertia between them by the density difference of them, and the speed difference between them is generated. By this speed difference, a shear force is applied to the interface of the spray fluid 11 and the spray medium 12, and atomization of the spray fluid 11 advances. The factors of change of the flow speed of the fluid mixture 13 include collision at the boundary layer of the wall surface of the flow passage, the bending section of the flow passage, and the joining section of the flow passage. In the joining section particularly, the flow speed significantly changes, and atomization of the spray fluid 11 advances. On the other hand, when the flow speed difference is small, integration of the particles of the spray fluid 11 may advance due to the surface tension of the spray fluid 11, and therefore the particle size of the spray fluid 11 may become large.

The item (E) shows an effect that atomization mainly of the spray fluid 11 advances by the momentum of the fluid mixture 13 when the fluid mixture 13 is sprayed from the outlet holes 41, 42. A shear force is applied to the surface of the spray fluid 11 due to the flow speed difference between the fluid mixture 13 and the ambient gas, and atomization of the spray fluid 11 advances. Also, the spray fluid 11 and the spray medium 12 get to have different inertia between them by the density difference of them, and a shear force is applied to the interface of the spray fluid 11 and the spray medium 12, and atomization of the spray fluid 11 advances.

In the atomizer 10 according to the present embodiment, when the spray fluid 11 is sprayed into the mixing chamber 27 and when the fluid mixture 13 is sprayed from the outlet holes 41, 42 to the outside, spray of fan shape is formed and atomization of the spray fluid 11 advances by the effects shown in items (A)-(E).

The spray method for forming the spray 14 and the spray 15, 16 which are flat and of fan shape by making the fluids collide on each other is called fan spray type spraying particularly. With respect to the flat and fan-shaped spray, it has a longer boundary part with the ambient gas and a shear force generated by the flow speed difference against the ambient gas is more liable to be applied to it compared to general conical spray. Therefore, the spray 14 and the spray 15, 16 which are flat and of fan-shape have a property that atomization is superior compared to the general conical spray. Also, with respect to the spray 14 and the spray 15, 16 which are flat and of fan-shape, the momentum of the spray drops quicker compared to the general conical spray because the spray diffuses in one direction in ejection and a shear force against the ambient gas is strongly applied to the spray. Therefore, the solid portion (coarse particles) in the spray hardly collides on the wall surface of the mixing chamber 27, and wear of the wall surface by collision of the solid portion on the wall surface can be suppressed.

The atomizer 10 according to the present embodiment has a feature in promoting atomization of the spray fluid 11 by the items (A), (B) in particular. The spray fluid 11 is made to collide on each other at the joining section 25 of the branched flow passages (the spray fluid flow passages 23, 24) and is sprayed to the mixing chamber 27 to be mixed with the spray medium 12 (items (A), (B)). In addition, the fluid mixture 13 is made to collide on each other at each of the joining sections 35, 36 of the branched flow passages (the spray fluid flow passages 31, 32 and the fluid mixture flow passages 33, 34) and is sprayed from the outlet holes 41, 42 to the outside of the atomizer 10 (items (C)-(E)). By going through spraying of such two steps, the atomizer 10 according to the present embodiment generates effects of promoting atomization of the spray fluid 11 shown in items 1)-3) described below.

1) An effect by expansion of the boundary part between the spray 14, 15, 16 and the ambient gas.
2) An effect by expansion of the speed difference between the spray fluid 11 and the spray medium 12 caused by attenuation of the flow speed of the spray 14.
3) An effect by suppressing adherence of the spray fluid 11 to the partition wall of the mixing chamber 27 caused by attenuation of the flow speed of the spray 14 and atomization of the spray fluid 11.

Below, by comparison of the atomizer 10 according to the present embodiment and the atomizer 100 according to a conventional art shown in FIG. 4, an effect of promotion of atomization of the spray fluid 11, possessed by the atomizer 10 according to the present embodiment, will be explained.

In the atomizer 100 according to a conventional art shown in FIG. 4, portions different from the atomizer 10 according to the present embodiment will be explained. In the atomizer 100 according to a conventional art shown in FIG. 4, the flow passage of the spray fluid 11 (the spray fluid flow passage 23) is not branched, and the spray fluid flow passage 23 connects the spray fluid supply flow passage 21 and a middle ejection hole 26c that is an outlet of the spray fluid flow passage 23 and is arranged in the upstream side partition wall 43 of the mixing chamber 27 to each other, and supplies the spray fluid 11 from the middle ejection hole 26c to the mixing chamber 27 without making the spray fluid 11 collide on each other. In other words, in the atomizer 100 according to a conventional art, the spray fluid flow passage 23 connected to the spray fluid supply flow passage 21 connects the spray fluid supply flow passage 21 and the mixing chamber 27 to each other directly without branching, and the spray fluid 11 passes through the spray fluid flow passage 23 and flows from the middle ejection hole 26c into the mixing chamber 27 as it is (without colliding on the spray fluid 11 having flowed through another flow passage). Therefore, the spray fluid 11 diffuses in a conical shape when entering the mixing chamber and forms spray 17.

The effect of the item 1) described above is an effect peculiar to a fan spray type atomizer as described above. With respect to the spray 14 that is flat and of fan shape ejected to the mixing chamber by the atomizer 10 according to the present embodiment, compared to the general conical spray 17 ejected by the atomizer 100 of a conventional art, it has a longer boundary part with the ambient gas and a shear force generated by the flow speed difference against the ambient gas is easily applied to it. Therefore, according to the spray 14 that is flat and of fan shape, atomization of the spray fluid 11 is promoted compared to the general conical spray 17 ejected by the atomizer 100 of a conventional art. Although only the spray 14 was explained above, atomization of the spray fluid 11 is also promoted in a similar manner with respect to the spray 15, 16.

The effect of the item 2) described above is a peculiar effect exerted by the atomizer 10 according to the present embodiment, generated by combination of the fan spray type atomizer and the mixing chamber 27. In the fan spray type atomizer, because the fluid (the spray fluid 11) is made to collide on each other and the spray 14 is formed, attenuation of the flow speed of the spray 14 advances by collision and diffusion of the spray fluid 11. On the other hand, with respect to the flow 18 of the spray medium 12 ejected to a closed space of the mixing chamber 27, attenuation of the flow speed by mixing does not advance because the volume of the ambient gas is small, and the flow speed remains high. Therefore, the speed difference increases between the spray 14 of the spray fluid 11 and the flow 18 of the spray medium 12. Accordingly, in the mixing chamber 27, atomization of the spray fluid 11 advances by a shear force generated by the speed difference between the spray fluid 11 and the spray medium 12.

In order to enhance this effect of atomization of the spray fluid 11, it is preferable that the intervals between the middle injection hole 26 and the outlets of the spray medium flow passages 29, 30 are increased as much as possible and the spray fluid 11 and the spray medium 12 are mixed with each other after attenuation of the flow speed of the spray 14 of the spray fluid 11. In the present embodiment, the outlets of the spray medium flow passages 29, 30 are arranged in the outermost part in the radial direction of the upstream side partition wall 43, namely arranged to be along the side partition wall 45, and the intervals between the middle injection hole 26 and the outlets of the spray medium flow passages 29, 30 are increased as shown in FIGS. 1, 3.

In the atomizer 10 according to the present embodiment shown in FIG. 1, the spray medium 12 flows to the downstream side along the side partition wall 45 of the mixing chamber 27 as shown in the flow 18, reverses at the vicinity of the downstream side partition wall 44 to flow to the upstream side, and is mixed with the spray 14 of the spray fluid 11. Thus, because the spray medium 12 is mixed with the spray fluid 11, a shear force generated by the speed difference of the both increases and atomization of the spray fluid 11 advances.

On the other hand, in the case of the atomizer 100 of a conventional art shown in FIG. 4, because the spray fluid 11 does not collide on the spray fluid 11 having flowed through another passage and is ejected in a conical shape, attenuation of the flow speed delays. In addition, because the spray fluid 11 is mixed with the spray medium 12 while flowing in the direction same as that of the flow of the spray medium 12, the speed difference of the both is small and atomization of the spray fluid 11 by a shear force does not advance. Even in the atomizer 100 of a conventional art, it is considered that the speed difference is generated between the spray fluid 11 and the spray medium 12 by the difference of the inertia of the both when the flow direction of the both changes in the vicinity of the downstream side partition wall 44 of the mixing chamber 27 and atomization of the spray fluid 11 advances. However, at this time, the particle size of the spray fluid 11 is large because atomization has not advanced, and a part of the particles is adhered to the downstream side partition wall 44 because of large inertia, and the particle size may possibly become large. In addition, there is a risk that the solid portion (coarse particles) in the particles of the spray fluid 11 collides on the wall surface of the mixing chamber 27 and the wall surface is worn.

The effect of the item 3) described above is also a peculiar effect exerted by the atomizer 10 according to the present embodiment, generated by combination of the fan spray type atomizer and the mixing chamber 27. As described above, by arranging the middle ejection hole 26 that is a fan spray type atomizer at the inlet of the mixing chamber 27, attenuation of the flow speed of the spray 14 advances. In addition, by atomization of the spray fluid 11, the surface area per weight of the spray fluid 11 increases, a resisting force at the surface (boundary) of the spray 14 increases, and the inertia is reduced. Therefore, the spray fluid 11 easily follows the flow inside the mixing chamber 27. Accordingly, by forming the flow 18 of the spray medium 12 along the side partition wall 45 of the mixing chamber 27 as shown in FIG. 1, the particles of the spray fluid 11 hardly reach the side partition wall 45 and adherence of the particles of the spray fluid 11 to the side partition wall 45 can be suppressed.

Particularly in the fan spray type atomizer, the particle size is comparatively large in the center part of the spray and is small in the peripheral part. Therefore, the particle size is small in the peripheral part of the spray 14 that flows toward the side partition wall 45, and particularly the flow of the spray fluid 11 easily follows the flow inside the mixing chamber 27. Accordingly, it can be suppressed that the particles of the spray fluid 11 are adhered to the side partition wall 45, coarse particles are formed at the side partition wall 45, and the wall surface of the side partition wall 45 is worn. In order to enhance this effect of suppressing formation of the coarse particles and wear of the wall surface, it is preferable to form the outlets of the spray medium flow passages 29, 30 along the side partition wall 45 and to increase the ejection speed of the spray medium 12.

On the other hand, in the case of the atomizer 100 of a conventional art shown in FIG. 4, coarse particles of the spray fluid 11 flow within the mixing chamber 27 because atomization of the spray fluid 11 does not advance. The coarse particles, which have small surface area per weight, have small resisting force at the surface and large inertia, and is, therefore, hard to follow the flow in the mixing chamber 27. As a result, the spray fluid 11 is adhered to the downstream side partition wall 44 of the mixing chamber 27 as described above, adhered also to the side partition wall 45 by the flow in the mixing chamber 27, and may possibly cause the wear of the wall surface.

Thus, by ejecting the spray fluid 11 from the middle ejection hole 26 as the fan spray type spray, attenuation of the flow speed of the particles of the spray fluid 11 becomes quick. On the other hand, in the mixing chamber 27, the spray medium 12 diffuses slowly, flows fast, and has strong turbulent flow because it flows in a closed space. Therefore, by combination of the fan spray type atomizer and the mixing chamber 27 as the atomizer 10 according to the present embodiment, atomization can be promoted by the effects of the items (A) and (B) described above. By these effects of promoting atomization, atomization of the spray fluid 11 advances on the downstream side of the mixing chamber 27 and the spray fluid 11 comes to easily follow the flow of the gas, and therefore the frequency of collision of the spray fluid 11 onto the wall surface drops. Also, the inertia of the spray fluid 11 is small because the particle size is small. Therefore, the wear of the wall surface of the mixing chamber 27, caused by collision of the solid portion (coarse particles) in the particles of the spray fluid 11 onto the wall surface, reduces. Note that this effect can be secured not only in the mixing chamber 27 but also in the fluid mixture flow passages 31-34 on the downstream side of the mixing chamber 27 and the outlet holes 41, 42 in a similar manner.

Further, as shown in FIGS. 1, 3, in the atomizer 10 according to the present embodiment, the middle ejection hole 26 through which the spray fluid 11 is ejected is formed by the joining section 25 of the spray fluid flow passages 23, 24 and the groove 28. (The middle ejection hole 26 is the communication section of the joining section 25 and the groove 28.) By arranging the grove 28, the spray 14 that is flat and of fan shape is easily formed. However, it is also possible not to arrange the groove 28 but to connect one end of a tubular flow passage to the joining section 25 with both ends of the tubular flow passage being open, and to make the other end of the tubular flow passage the middle ejection hole 26. Thus, the groove 28 can be omitted because the spray 14 of fan shape can be formed even with such a configuration.

Also, the outlet hole 41 through which the fluid mixture 13 is ejected to the outside is formed by the joining section of the fluid mixture flow passages 31, 32 and the groove 37. By arranging the grove 37, the spray 15 of fan shape is easily formed. However, it is also possible not to arrange the groove 37 but to connect one end of a tubular flow passage to the joining section 35 with both ends of the tubular flow passage being open and to make the other end of the tubular flow passage the outlet hole 41. Thus, the groove 37 can be omitted because the spray 15 of fan shape can be formed even with such a configuration. In a similar manner, the groove 38 can be omitted because it is possible to form the spray 16 of fan shape even when the groove 38 is not arranged, one end of a tubular flow passage with both ends open is connected to the joining section 36, and the other end of the tubular flow passage is made the outlet hole 42.

Also, as shown in FIGS. 1, 3, in the atomizer 10 according to the present embodiment, the middle ejection hole 26 is arranged in the center of the upstream side partition wall 43 of the mixing chamber 27, and the outlets of the spray medium flow passages 29, 30 are arranged to be arrayed on opposite sides of the groove 28 in the direction (the vertical direction of FIG. 3) perpendicular to the extending direction of the groove 28. (In other words, the outlets of the spray medium flow passages 29, 30 are arranged to be arrayed in the direction along which the spray fluid flow passages 23, 24 are connected to each other.) By arranging the middle ejection hole 26 and the outlets of the spray medium flow passages 29, 30 in this way and forming the flow of the spray medium 12 along the side partition wall 45 of the mixing chamber 27, the particles of the spray fluid 11 is hard to reach the side partition wall 45. Note that, as described above, because the particle size of the spray 14 of fan shape is smaller in the peripheral part of the spray 14 compared to the center part of it and the peripheral part of the spray 14 easily flows following the ambient gas, the outlets of the spray medium flow passages 29, 30 need not be disposed at positions shown in FIGS. 1, 3. Examples of an atomizer in which the outlet of the spray medium flow passage is different from FIGS. 1, 3 will be explained with reference to FIGS. 5, 6.

FIG. 5 is a cross-sectional view at a position corresponding to the cut line A-A of FIG. 1 with respect to the atomizer 10a according to a modification of the present embodiment. The number of the outlet of a spray medium flow passage 29a arranged in the upstream side partition wall 43 of the mixing chamber 27 is one as shown in FIG. 5, and the outlet may be arranged in an annular shape to surround the middle ejection hole 26 and the groove 28. By making the outlet of the spray medium flow passage 29a an annular shape, such effect is secured that the spray medium flows along the side partition wall 45 and the particles of the spray fluid 11 are hardly adhered. At this time, it is preferable that the outlet of the spray medium flow passage 29a is arranged to be along the side partition wall 45 of the mixing chamber 27 and the interval is made long between the middle ejection hole 26 and the outlet of the spray medium flow passage 29a.

FIG. 6 is a cross-sectional view at a position corresponding to the cut line A-A of FIG. 1 with respect to the atomizer 10b according to another modification of the present embodiment. The outlets of the spray medium flow passages 29, 30 may be arranged to be arrayed on opposite sides of the groove 28 in the extending direction of the groove 28 (the horizontal direction of FIG. 6) as shown in FIG. 6.

In the atomizer 10 according to the present embodiment as shown in FIG. 1, the sectional area (cross-sectional area) of the mixing chamber 27 in the cross section perpendicular to the axis of the atomizer 10 is constant in the axial direction (X-direction). However, the sectional area may not be constant in the axial direction. A case of an atomizer in which the sectional area of the mixing chamber 27 is different from FIG. 1 will be explained with reference to FIG. 7.

FIG. 7 is a cross-sectional view of a front end section along the axial direction (X-direction) with respect to the atomizer 10c according to another modification of the present embodiment. As shown in FIG. 7, the sectional area (cross-sectional area) of the mixing chamber 27 in the cross section perpendicular to the axis of the atomizer 10c reduces from the upstream side to the downstream side along the axial direction. By reducing the sectional area of the mixing chamber 27 on the downstream side, the flow speed of the fluid mixture 13 can be increased. In a condition of low flow speed and less turbulence, integration of the particles of the spray fluid 11 advances by gravity and surface tension and the particle size of the spray fluid 11 increases. However, by reducing the sectional area of the mixing chamber 27 on the downstream side and increasing the flow speed of the fluid mixture 13, increasing of the particle size of the spray fluid 11 can be prevented.

It is preferable to reduce the sectional area of the mixing chamber 27 from the upstream side to the downstream side. The reason is that, in order to enhance the effect of combining the fan spray type atomizer and the mixing chamber 27 described above, it is preferable that the intervals between the middle ejection hole 26 and the outlets of the spray medium flow passages 29, 30 are large.

The shape of the mixing chamber 27 may be a flat shape matching the shape of the spray 14 that is flat and of fan shape, ejected from the middle ejection hole 26. Such a shape of the mixing chamber 27 is preferable because an effect is secured which the particles of the spray fluid 11 are hardly adhered to the side partition wall 45.

Further, although one middle ejection hole 26 and two outlet holes 41, 42 are provided in the atomizer 10 according to the present embodiment as shown in FIGS. 1-3, the number of them may be one or more. With a plurality of the middle ejection holes 26 and the outlet holes 41, 42, the flat and fan-shaped spray 14-16 is thinner and such effect is secured that a shear force generated by the speed difference against the ambient gas is applied strongly, although the structure of the atomizer 10 is complicated. Therefore, the spray fluid 11 is more easily atomized. According to the number of the middle ejection hole 26 and the outlet holes 41, 42, the number (or the number of the pairs) of the spray fluid flow passage and the fluid mixture flow passage is determined. For example, the number of the spray fluid flow passage is four (two pairs) when two middle ejection holes are provided, and the number of the fluid mixture flow passage is two (one pair) when one outlet hole is provided. An example of an atomizer including two middle ejection holes will be explained with reference to FIG. 8.

FIG. 8 is a cross-sectional view at a position corresponding to the cut line A-A of FIG. 1 with respect to the atomizer 10d according to another modification of the present embodiment. The atomizer 10d includes four spray fluid flow passages 23a, 23b, 24a, 24b, two grooves 28a, 28b, and two middle ejection holes 26a, 26b. The spray fluid flow passages 23a, 24a are a pair of spray fluid flow passages, and the spray fluid flow passages 23b, 24b are a pair of spray fluid flow passages. The groove 28a is arranged to extend in the direction perpendicular to the direction along which the spray fluid flow passages 23a, 24a are connected to each other, and the groove 28b is arranged to extend in the direction perpendicular to the direction along which the spray fluid flow passages 23b, 24b are connected to each other. The middle ejection hole 26a is combined with the groove 28a, and the middle ejection hole 26b is combined with the groove 28b. The middle ejection holes 26a, 26b are arranged to be arrayed in the extending direction of the grooves 28a, 28b. In the atomizer 10d, similarly to the atomizer 10a shown in FIG. 5, the number of the outlet of the spray medium flow passage 29a is one, and the outlet is arranged to surround the middle ejection holes 26a, 26b and the grooves 28a, 28b.

Further, the number of the outlet of the spray medium flow passage may be one as shown in FIGS. 5, 8, may be two as shown in FIGS. 3, 6, and may be three or more as is not illustrated. Therefore, it is also possible to arrange a plurality of the middle ejection holes and/or a plurality of the outlets of the spray medium flow passages. With such configuration, mixing of the spray fluid 11 and the spray medium 12 can advance, and atomization of the spray fluid 11 can be promoted by a shear force generated by the speed difference of the both.

In the atomizer 10 according to the present embodiment, the front end section thereof includes the atomizer inner tube 46 and the atomizer outer tube 47 as shown in FIG. 1. The atomizer 10 may be configured to include an atomizer tube in which the atomizer inner tube 46 and the atomizer outer tube 47 are integrated.

It is preferable to atomize the spray fluid 11 in the fluid mixture 13 that is ejected to the outside from the outlet holes 41, 42 of the atomizer 10 to less than 100 µm, or, if possible, 50 µm or less in diameter. The spray fluid 11 having been atomized has large surface area per volume, easily raised in temperature and evaporated by heat radiation from the combustion chamber. Further, the combustion reaction of the spray fluid 11 as the liquid droplet is also quick.

On the other hand, the coarse particles of 150 µm or more in diameter hardly evaporate and combust and are a cause for discharging carbon monoxide (CO) and particulate matters as the unburnt carbon. They are also a cause for discharging nitrogen oxide because the spray fluid including such coarse particles does not mix well with the air.

The atomizer 10 according to the present embodiment has high atomization performance and can contribute to promotion of the combustion reaction by increasing fine particles of the spray fluid 11. The degree of atomization can be adjusted by the supply pressure of the spray fluid 11 and the spray medium 12 and the volume of the spray medium 12 (the rate of the spray medium 12 to the spray fluid 11). In the atomizer 10 according to the present embodiment, the diameter of the particles of the spray fluid 11 can be made 50 μm or less by properly setting these conditions.

When a liquid fuel is used for a gas turbine combustor, lean premixed combustion is effective for reducing nitrogen oxide. In the lean premixed combustion, the temperature at the time of combustion is uniform and generation of thermal NOx at the high temperature portion is suppressed by combustion after excessive air is mixed to the fuel beforehand. When a liquid fuel is used, it is necessary to vaporize the liquid fuel component beforehand and mix it with the air before combustion. When the liquid fuel is atomized by enhancing the atomization performance of the atomizer 10 and increasing fine particles, the surface area per weight of the liquid fuel increases and vaporization becomes easy. Also, by atomization of the liquid fuel, the combustion reaction is quick because the surface area per weight increases even when the fuel is combusted without vaporized. Accordingly, unburnt carbon is hardly generated, and the volume of CO and particulate matters generated from the combustion device can be reduced.

When the atomizer 10 according to the present embodiment is applied to an atomizer of a gas turbine combustor, the momentum of the spray 15, 16 quickly drops compared to general conical spray because the spray 15, 16 which are flat and of fan shape are formed. Spray particles formed by atomization of the spray fluid 11 are hardly adhered to the partition wall of the combustion chamber of the gas turbine combustor including the atomizer 10 because the spray particles flow according to the gas stream inside the combustor. Therefore, troubles such as combustion caused by adherence of the spray particles to the partition wall of the combustion chamber of the gas turbine combustor and caulking caused by degradation of the liquid fuel are hardly brought about.

Further, when the atomizer 10 according to the present embodiment is applied to a combustor or a boiler of a diffusion combustion method in which the fuel and air are supplied separately and are combusted, the fuel and the air can be mixed well and nitrogen oxide can be reduced because the rate of the vaporized liquid fuel increases by atomization. Also, because the surface area per weight increases by atomization of the fuel, the combustion reaction is quick and the volume of CO and particulate matters can be reduced.

Further, by enhancing the atomization performance of the fuel, the fuel can be atomized even when the used amount of the spray medium 12 is further reduced and the supply pressure of the spray fluid 11 and the spray medium 12 is further lowered. Therefore, the consumption of energy can be reduced required for supply and pressurization of the spray fluid 11 and the spray medium 12. Also, because the amount of CO and particulate matters which are unburnt carbon reduces, excess air fed to the combustion device including the atomizer 10 can be reduced. When the excess air is reduced, amount of the combustion exhaust gas is also lowered, the sensible heat emitted to the outside of the combustion device with the combustion exhaust gas is reduced, and the thermal efficiency can be improved.

Second Embodiment

An atomizer 50 according to the second embodiment of the present invention will be explained with reference to FIGS. 9-11.

Figure 9:
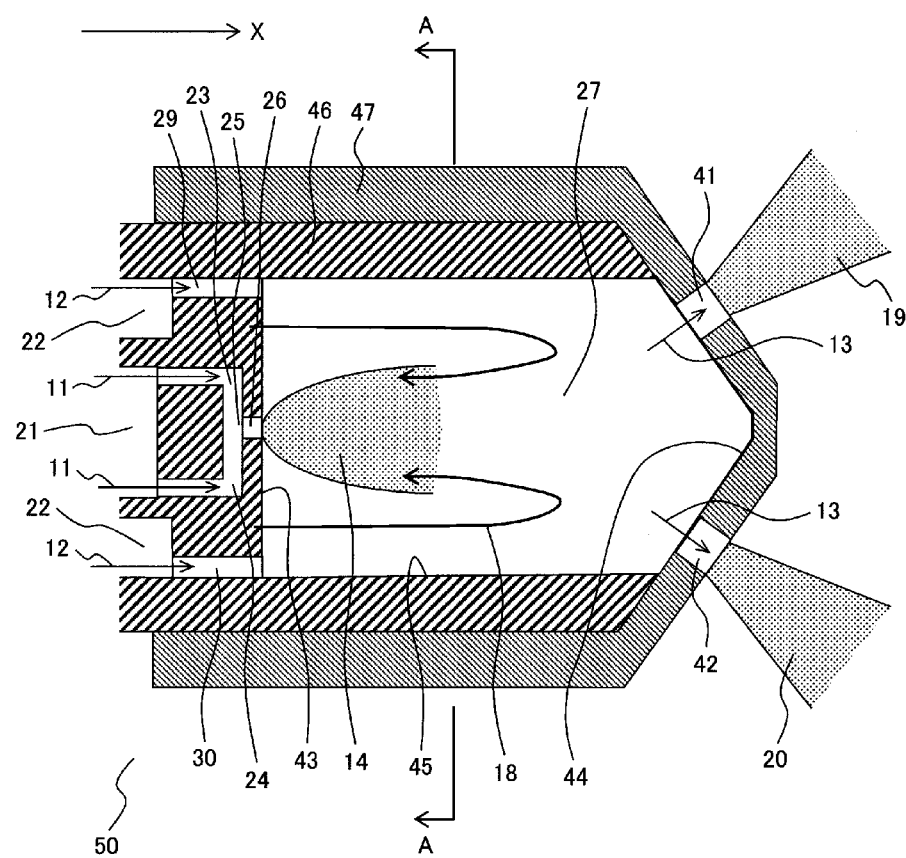
FIG. 9 is a cross-sectional view of a front end section of an atomizer according to the second embodiment of the present invention along the axial direction.

FIG. 9 is a cross-sectional view of a front end section of the atomizer 50 according to the present embodiment along the axial direction (X-direction). In FIG. 9, X-direction is the axial direction of the atomizer 50 and is the supply direction of the spray fluid. FIG. 10 is a front view when the atomizer 50 of FIG. 9 is viewed from the downstream side of the supply direction of the spray fluid. FIG. 11 is a cross-sectional view of the atomizer 50 taken along the cut line A-A of FIG. 9, and is a cross-sectional view when the atomizer 50 is viewed from the downstream side of the supply direction of the spray fluid at the position of the mixing chamber 27 of the atomizer 50. In FIGS. 10, 11, Y-direction is the radial direction of the atomizer 50.

In the atomizer 50 according to the present embodiment, the basic configuration is same as that of the atomizer 10 according to the first embodiment explained with reference to FIGS. 1-3 and, therefore, explanation of the configurations common to the both will be omitted and only different portions will be explained below. Also, explanation of the effects explained in the first embodiment of the effects exerted by the atomizer 50 according to the present embodiment will be omitted.

In the atomizer 50 according to the present embodiment, the structure of a portion for spraying the fluid mixture 13 from the outlet holes 41, 42 to the outside of the atomizer 50 is different from that of the atomizer 10 according to the first embodiment. In the atomizer 50 according to the present embodiment, the fluid mixture flow passages 31-34 (refer to FIG. 1) included in the atomizer 10 according to the first embodiment are not provided, and the downstream side partition wall 44 located on the downstream side of the mixing chamber 27 and forming the mixing chamber 27 is arranged at a position close to the surface of the outlet side (downstream side) of the atomizer 50. The outlet holes 41, 42 that spray the fluid mixture 13 of the spray fluid 11 and the spray medium 12 to the outside are arranged in the downstream side partition wall 44 and directly connect the mixing chamber 27 and the outside of the atomizer 50 to each other. The fluid mixture 13 is sprayed from the mixing chamber 27 to the outside of the atomizer 50 through the outlet holes 41, 42.

The fluid mixture 13 becomes conical spray 19, 20 when it is ejected from the outlet holes 41, 42 to the outside of the atomizer 50. In the boundary part of the conical spray 19, 20 with the gas outside the atomizer 50, a shear force is applied to the spray fluid 11 in the fluid mixture 13 due to the flow speed difference against the gas outside the atomizer 50, and the spray fluid 11 is atomized.

In the atomizer 50 according to the present embodiment, atomization of the spray fluid 11 advances mainly by the effects shown in items (A), (B), (F), and (E) described below.

(A) Atomization by the flow speed difference between the spray 14 of fan shape and the gas inside the mixing chamber 27 when the spray fluid 11 flows from the middle ejection hole 26 into the mixing chamber 27.

(B) Mixing of the spray fluid 11 and the spray medium 12 in the mixing chamber 27.

(F) Atomization by shear of the liquid film at the downstream side partition wall 44, caused by the flow of the fluid mixture 13 inside the outlet holes 41, 42.

(E) Atomization by the flow speed difference between the spray 19, 20 and the gas outside the atomizer 50 when the fluid mixture 13 is sprayed from the outlet holes 41, 42 to the outside of the atomizer 50.

The items (A), (B), and (E) are same as those explained in the first embodiment. However, because the spray 19, 20 sprayed from the outlet holes 41, 42 is conical, the boundary part of the spray 19, 20 with the ambient gas is short compared to the spray 15, 16 that is flat and of fan shape in the atomizer 10 according to the first embodiment. Also, in general, attenuation of the flow speed of the particles of the spray fluid 11 during spraying delays compared to the atomizer 10 according to the first embodiment.

The item (F) is an effect generated by rapid reduction and rapid expansion of the flow passage which is used when the fluid mixture 13 is ejected from the mixing chamber 27 to the outside through the outlet holes 41, 42. Particularly, the liquid film of the spray fluid 11 adhered to the partition wall of the mixing chamber 27 becomes coarse particles if the liquid film is discharged as it is from the outlet holes 41, 42. By rapid reduction and rapid expansion of the flow width of the fluid mixture 13 caused by the rapid reduction and the rapid expansion of the flow passage, the boundary layer between the fluid mixture 13 and the wall surface does not develop at the portion of the outlet holes 41, 42, and a fast flow is formed in the vicinity of the wall surface. Therefore, a shear force is applied by this fast flow to the liquid film of the spray fluid 11 adhered to the wall surface, and the spray fluid 11 is atomized. In the atomizer 50 according to the present embodiment, in general, the particle size of the particles of the spray fluid 11 is comparatively large in the peripheral part of the conical spray 19, 20 and small in the inside thereof because the spray fluid 11 is atomized from the liquid film and the portion where the fast flow is formed is short as the portion is the outlet holes 41, 42.

In addition to the effect the atomizer 10 according to the first embodiment has, the atomizer 50 according to the present embodiment also has an effect that manufacturing is easy because the flow passage on the downstream side of the mixing chamber 27 is simplified. Further, there is also an advantage of reduction of the worn position of the wall surface of the flow passage and contribution to extension of the life of the atomizer 50 because the flow passage on the downstream side is simplified.

The atomizer 50 according to the present embodiment has a feature in promoting atomization of the spray fluid 11 by the items (A), (B) in particular. The spray fluid 11 is made to collide on each other at the joining section 25 of the branched flow passages (the spray fluid flow passages 23, 24) and is sprayed to the mixing chamber 27 to be mixed with the spray medium 12 (items (A), (B)). In addition, the fluid mixture 13 is sprayed from the outlet holes 41, 42 to the outside of the atomizer 50 at a high speed (items (F), (E)). By going through spraying of such two steps, in the atomizer 50 according to the present embodiment, effects of promoting atomization of the spray fluid 11 shown in items 1)-3) described below are generated similarly to the atomizer 10 of the first embodiment. Note that explanation of the effects in the items 1)-3) described below will be omitted here because the effects are same as those explained in the first embodiment.

1) An effect by expansion of the boundary part between the spray 14 and the ambient gas.

2) An effect by expansion of the speed difference between the spray fluid 11 and the spray medium 12 caused by attenuation of the flow speed of the spray 14.

3) An effect by suppressing adherence of the spray fluid 11 to the partition wall of the mixing chamber 27 caused by attenuation of the flow speed of the spray 14 and atomization of the spray fluid 11.

The effects of the items 2) and 3) described above are peculiar effects exerted by the atomizer 50 according to the present embodiment, generated by combination of the fan spray type atomizer and the mixing chamber 27 as was explained in the first embodiment.

As shown in FIG. 9, in the atomizer 50 according to the present embodiment, the sectional area (cross-sectional area) of the mixing chamber 27 in the cross section perpendicular to the axis of the atomizer 50 is constant in the axial direction (X-direction). The sectional area (cross-sectional area) may not be constant similarly to the atomizer 10c of the first embodiment. For example, as shown in FIG. 7 explained in the first embodiment, the sectional area of the mixing chamber 27 in the cross section perpendicular to the axis of the atomizer 50 may reduce from the upstream side to the downstream side along the axial direction.

As explained in the first embodiment, the shape of the mixing chamber 27 may be a flat shape matching the shape of the flat and fan-shaped spray 14, ejected from the middle ejection hole 26.

Figure 10:
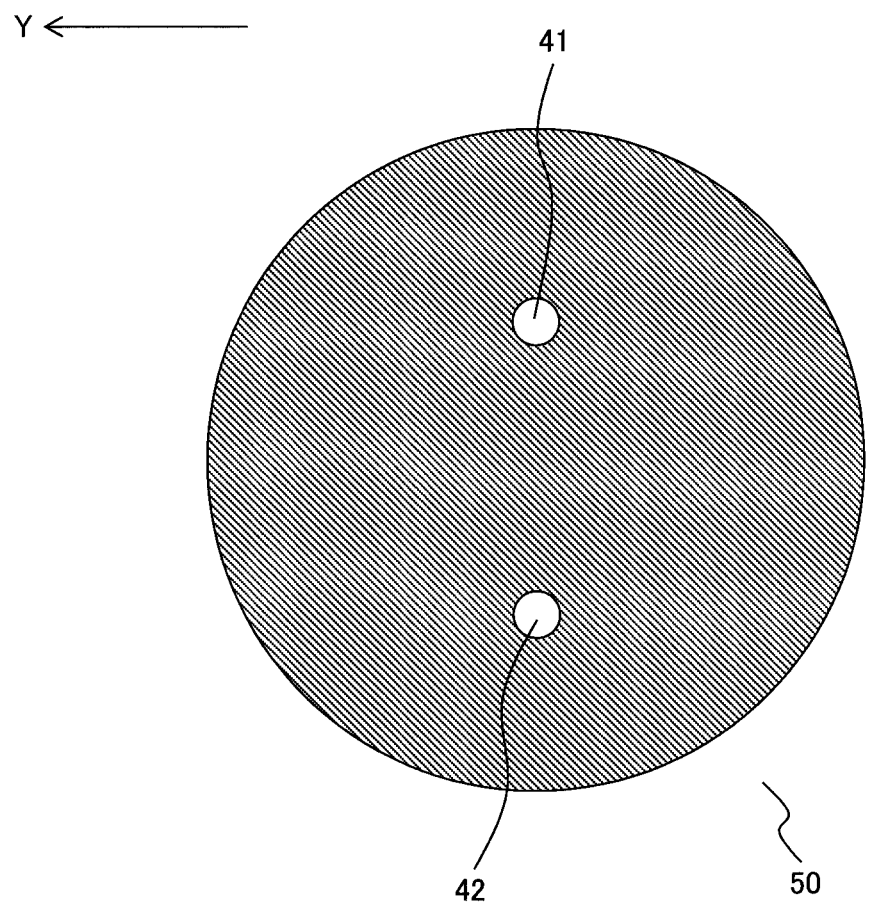
FIG. 10 is a front view when the atomizer of FIG. 9 is viewed from the downstream side of the supply direction of the spray fluid.
Figure 11:
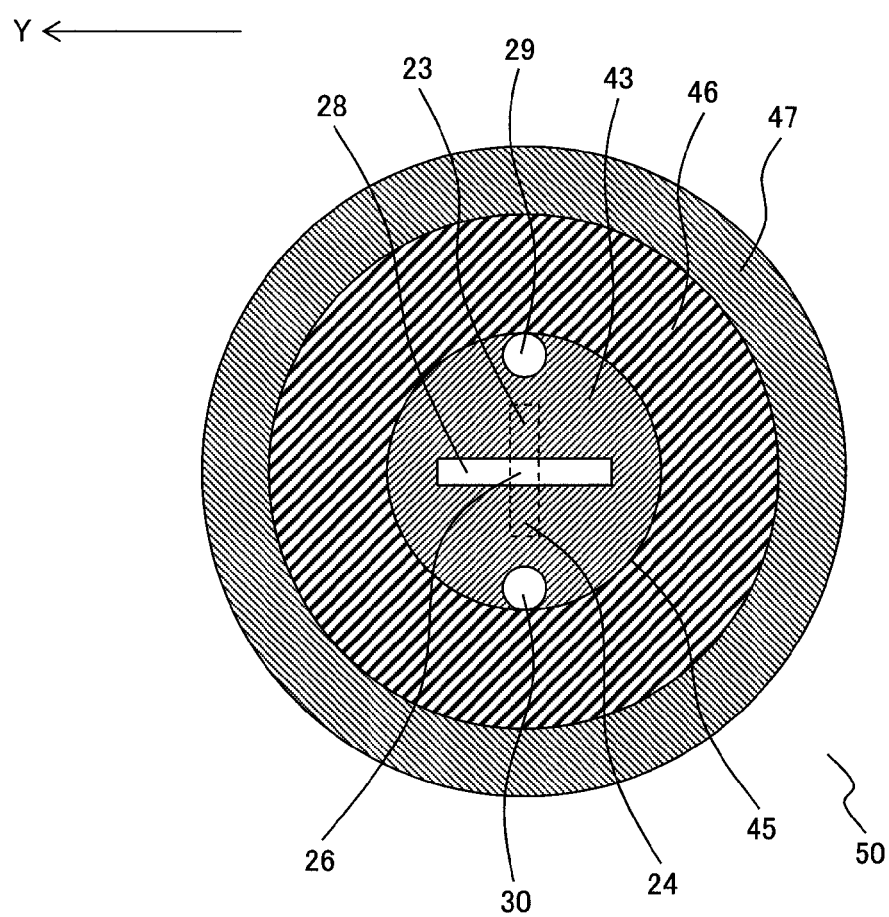
FIG. 11 is a cross-sectional view of the atomizer taken along the cut line A-A of FIG. 9.

Further, although one middle ejection hole 26 and two outlet holes 41, 42 are provided in the atomizer 50 according to the present embodiment as shown in FIGS. 9-11, the number of them may be one or more. With a plurality of the middle ejection holes 26 and the outlet holes 41, 42, although the structure of the atomizer 50 is complicated, the boundary surfaces with the ambient gas increases because the number of the spray increases and such effect is secured that a shear force is applied strongly. Therefore, the spray fluid 11 is easily atomized. In the atomizer 50 according to the present embodiment, the number of the outlet holes 41, 42 can be comparatively easily increased because the downstream side of the mixing chamber 27 has a structure simpler than that of the atomizer 10 according to the first embodiment.

In the atomizer 50 according to the present embodiment, the front end section thereof includes the atomizer inner tube 46 and the atomizer outer tube 47 as shown in FIG. 9. The atomizer 50 may be configured to include an atomizer tube in which the atomizer inner tube 46 and the atomizer outer tube 47 are integrated.

When the atomizer 50 according to the present embodiment is applied to an atomizer of a gas turbine combustor, the spread region of the conical spray 19, 20 is also narrow on the downstream side of the outlet holes 41, 42. However, by properly providing the ejection direction of the spray 19, 20, spray particles formed by atomization of the spray fluid 11 are hardly adhered to the partition wall of the combustion chamber of the gas turbine combustor. As a result, troubles such as combustion caused by adherence of the spray particles to the partition wall of the combustion chamber of the gas turbine combustor and caulking caused by degradation of the liquid fuel are hardly brought about.

Third Embodiment

A combustion device including an atomizer, according to an embodiment of the present invention, will be explained with reference to FIG. 12. In the present embodiment, a gas turbine combustor will be exemplified as a combustion device including an atomizer. In the present embodiment, the gas turbine combustor includes the atomizer 10 shown in the first embodiment, and alternatively it may include the atomizer 50 shown in the second embodiment.

Figure 12:
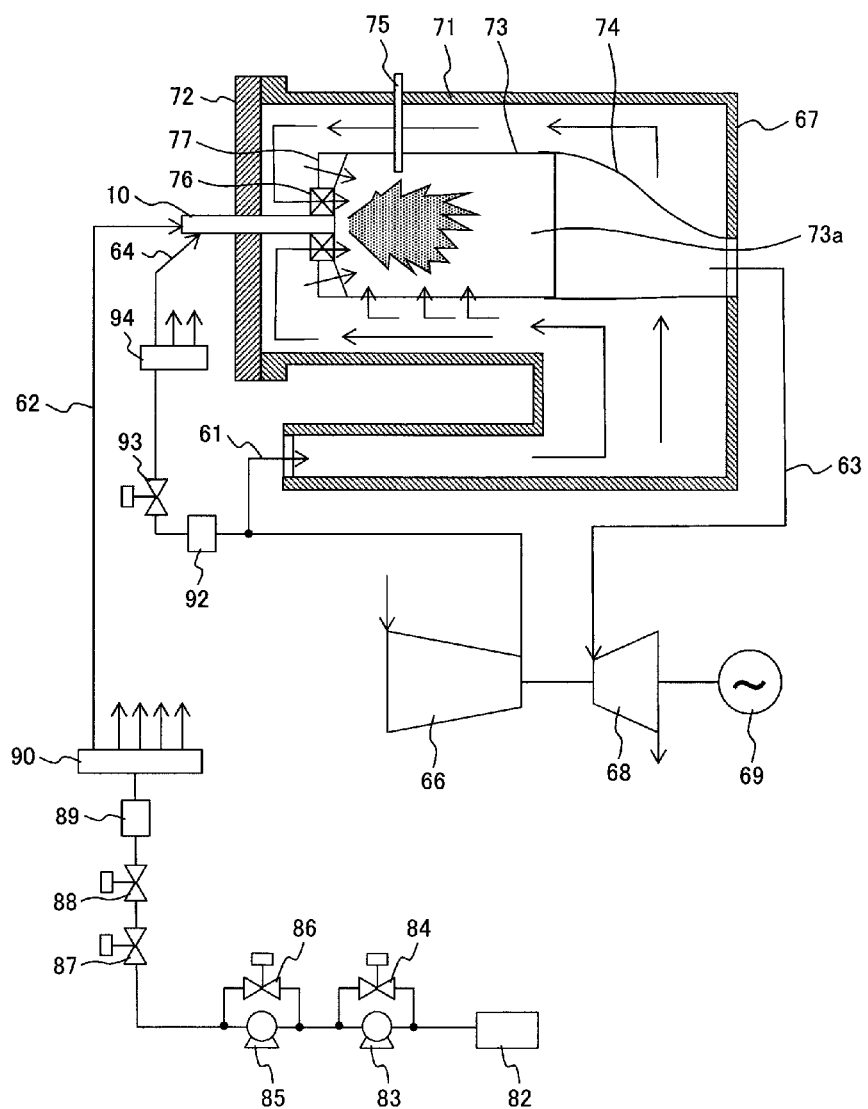
FIG. 12 is a schematic view showing a whole configuration of a gas turbine plant where a gas turbine combustion device according to the third embodiment of the present invention is installed.

FIG. 12 is a schematic view showing a whole configuration of a gas turbine plant where a gas turbine combustion device 67 according to the present embodiment is installed. The gas turbine plant shown in FIG. 12 includes a compressor 66, a gas turbine combustor 67, a turbine 68, and a generator 69. The compressor 66 compresses air to generate high pressure combustion air 61 and supplies the high pressure combustion air 61 to the gas turbine combustor 67. The gas turbine combustor 67 is a combustion device that introduces the combustion air 61 and fuel 62 (liquid fuel) and combusts the fuel 62 to generate high temperature combustion gas 63 (combustion exhaust gas). The turbine 68 introduces the combustion gas 63 generated by the gas turbine combustor 67, is driven by the combustion gas 63 to rotate the generator 69 and generate electric power, and drives the compressor 66. The generator 69 is driven by the turbine 68 and generates electric power. The gas turbine combustor 67 includes the atomizer 10 that introduces the fuel 62.

In the present embodiment, an example is described that the generator 69 is driven and generates electric power by the power obtained by the turbine 68 in the gas turbine plant. The power obtained by the turbine 68 may be used for another rotating machine.

The gas turbine combustor 67 according to the present embodiment includes an outer tube 71 that introduces the combustion air 61 and an end cover 72 attached to the outer tube 71. The outer tube 71 and the end cover 72 form a hermetically closed pressure vessel. The atomizer 10 is arranged to penetrate the end cover 72.

Inside of the outer tube 71, an inner tube 73 that includes a combustion chamber 73*a* in it and a transition piece 74 positioned downstream of the inner tube 73 are arranged. The combustion chamber 73*a* is a combustion space to which the combustion air 61 and the fuel 62 sprayed from the atomizer 10 are supplied and which mixes and combusts the combustion air 61 and the fuel 62 and generates the combustion gas 63. The transition piece 74 is a flow passage for the combustion gas 63, the upstream side thereof connected to the combustion chamber 73*a* and the downstream side thereof connected to the exhaust port for the combustion gas 63. The flow passage of the transition piece 74 narrows from the combustion chamber 73*a* toward the exhaust port. The outer tube 71 is connected to the turbine 68 on the downstream side of the transition piece 74.

The combustion air 61 passes through a space between the outer tube 71 and the inner tube 73 and is supplied into the inner tube 73 from the most upstream part (the end cover 72 side of FIG. 12) of the inner tube 73. The fuel 62 is sprayed from the atomizer 10 to the combustion chamber 73*a* inside the inner tube 73. The fuel 62 sprayed to the combustion chamber 73*a* is mixed with the combustion air 61 and becomes a gas mixture, and the gas mixture starts combustion upon being ignited by an ignition plug 75.

In the gas turbine combustor 67, reduction is required for nitrogen oxide (NOx), carbon monoxide (CO), and particulate matters. Therefore, in order to improve mixing of the combustion air 61 and the fuel 62, a swirler 76 that imparts a swirl flow to the combustion air 61 and an air inlet port 77 are arranged in the inner tube 73. The ejection direction, flow speed, and flow rate distribution of the combustion air 61 can be adjusted by the swirler 76 and the air inlet port 77 when the combustion air 61 flows into the combustion chamber 73*a*.

A fuel supply system that supplies the fuel 62 (liquid fuel) to the gas turbine combustor 67 according to the present embodiment will be explained. The fuel supply system is a system for connecting a fuel tank 82 that stores the fuel 62 and the atomizer 10 installed in the gas turbine combustor 67 to each other, and supplies the fuel 62 stored in the fuel tank 82 to the atomizer 10. The fuel supply system includes the fuel tank 82, a transfer pump 83 that transfers the fuel 62 from the fuel tank 82, and a transfer regulating valve 84 that regulates the amount of the fuel 62 transferred by the transfer pump 83. Further, on the downstream side of the transfer pump 83 and the transfer regulating valve 84, a high pressure pump 85 that pressurizes the fuel 62, and a pressure regulating valve 86 that regulates the pressure of the fuel 62 are installed. In addition, a shutoff valve 87 that shuts off supply of the fuel 62, a flow regulating valve 88 and a fuel flow meter 89 which regulate the flow amount of the fuel 62, and a fuel distributor 90 that distributes the fuel 62 are installed on the downstream side of the high pressure pump 85 and the pressure regulating valve 86. The fuel 62 distributed by the fuel distributor 90 is supplied to the atomizer 10.

Apart of the combustion air 61 compressed by the compressor 66 is supplied to the gas turbine combustor 67 as spraying air 64. Apart of the combustion air 61 compressed by the compressor 66 is compressed by a high pressure compressor 92 and is supplied to the atomizer 10 as the spraying air 64 through a pressure/flow amount regulating valve 93 and an air distributor 94 installed on the downstream side of the high pressure compressor 92.

Thus, the fuel 62 (liquid fuel) as the spray fluid 11 and the spraying air 64 as the spray medium 12 are supplied to the atomizer 10.

The spraying air 64 is used for atomization of the fuel 62 and is also used as purging air for removing a residue inside the flow passage and the atomizer 10 in starting and stopping supply of the fuel 62.

Examples of obtaining the spraying air 64 include a method for compressing the combustion air 61 which has been obtained by compression in the compressor 66 as the present embodiment and a method for using compressed air which has been obtained by a dedicated compressor. It is also possible to supply steam as the spray medium 12 instead of the spraying air 64.

In the gas turbine combustor 67 according to the present embodiment, a case of using a liquid fuel as the fuel 62 is exemplified. The gas turbine combustor according to the present embodiment can also use a gas fuel and a liquid fuel as the fuel. To be more specific, the gas turbine combustor according to the present embodiment can be applied to a so-called dual-fuel gas turbine combustor which includes a gas fuel supply system and a liquid fuel supply system and uses the gas fuel and the liquid fuel according to the supply condition of the fuel.

It is preferable to atomize the liquid fuel to less than 100 μm, or, if possible, 50 μm or less in diameter. The liquid fuel having been atomized has large surface area per volume, easily raised in temperature and evaporated by heat radiation from the combustion chamber 73*a*. Further, the combustion reaction of the liquid fuel as the liquid droplet is also quick.

On the other hand, the coarse particles of 150 μm or more in diameter hardly evaporate and combust and are a cause of discharging CO and particulate matters as the unburnt carbon. They are also a cause for discharging nitrogen oxide because the spray fluid 11 (liquid fuel) does not mix well with the combustion air 61.

The gas turbine combustor 67 according to the present embodiment can contribute to promotion of the combustion reaction by increasing fine particles of the spray fluid 11 by the atomizer 10. The degree of atomization can be adjusted by the supply pressure of the spray fluid 11 and the spray medium 12 and the volume of the spray medium 12 (the rate of the spray medium 12 to the spray fluid 11).

As described above, the gas turbine combustor 67 which is a combustion device according to the present embodiment includes the atomizer 10 according to the first embodiment (or the atomizer 50 according to the second embodiment), promotes atomization of the spray fluid 11 in the fluid mixture 13 sprayed from the atomizer 10, and achieves both of reduction of the used amount of the spray medium 12 and lowering of the supply pressure of the spray fluid 11 and the spray medium 12 by improving the atomization performance. By reduction of the used amount of the spray medium 12 and lowering of the supply pressure of the spray fluid 11 and the spray medium 12, consumption of the energy required for pressurization and supply can be reduced. Moreover, wear of the atomizer 10 and caulking in the flow passages can be suppressed, and the life of the atomizer 10 can be extended.

Further, because the surface area per unit weight of the liquid fuel increases by atomization of the spray fluid 11, the combustion reaction proceeds quickly. As a result, consumption of oxygen advances, generation of nitrogen oxide is suppressed, the amount of CO and particulate matters which are unburnt carbon at the outlet of the combustion device is reduced, and the combustion efficiency is improved.

Even when the combustion device is a combustor or a boiler of a diffusion combustion method in which the fuel and air are supplied separately and are combusted, the effect of reducing nitrogen oxide, CO, and particulate matters is secured by atomizing the spray fluid using the atomizer according to the present invention.

Note that the present invention is not limited to the embodiments described above and includes various modifications. For example, the embodiments above are described in detail for easy understanding of the present invention, and the present invention is not limited to aspects that include all the configurations described. A part of the configuration of an embodiment can be replaced by a configuration of another embodiment. It is also possible to add a configuration of an embodiment to a configuration of another embodiment. Furthermore, with respect to a part of the configurations of each embodiment, it is possible to effect addition, deletion and replacement of a configuration of other embodiments.

EXPLANATION OF REFERENCE CHARACTERS 10, 10a-10d, 50 . . . atomizer
11 . . . spray fluid
12 . . . spray medium
13 . . . fluid mixture
14-17, 19, 20 . . . spray
18 . . . flow of spray medium
21 . . . spray fluid supply flow passage
22 . . . spray medium supply flow passage
23, 23a, 23b, 24, 24a, 24b . . . spray fluid flow passage
25 . . . joining section
26, 26a-26c . . . middle ejection hole
27 . . . mixing chamber
28, 28a, 28b . . . groove
29, 30 . . . spray medium flow passage
29a . . . spray medium flow passage
31-34 . . . fluid mixture flow passage
35, 36 . . . joining section
37, 38 . . . groove
41, 42 . . . outlet hole
43 . . . upstream side partition wall
44 . . . downstream side partition wall
45 . . . side partition wall
46 . . . atomizer inner tube
47 . . . atomizer outer tube
61 . . . combustion air
62 . . . fuel
63 . . . combustion gas
64 . . . spraying air
66 . . . compressor
67 . . . gas turbine combustor
68 . . . turbine
69 . . . generator
71 . . . outer tube
72 . . . end cover
73 . . . inner tube
73a . . . combustion chamber
74 . . . transition piece
75 . . . ignition plug
76 . . . swirler
77 . . . air inlet port
82 . . . fuel tank
83 . . . transfer pump
84 . . . transfer regulating valve
85 . . . high pressure pump
86 . . . pressure regulating valve
87 . . . shutoff valve
88 . . . flow regulating valve
89 . . . fuel flow meter
90 . . . fuel distributor
92 . . . high pressure compressor
93 . . . pressure/flow amount regulating valve
94 . . . air distributor
100 . . . atomizer of conventional art

What is claimed is:

1. An atomizer, comprising:
a mixing chamber configured to form a fluid mixture that includes a spray fluid as fuel and a spray medium as gas, the gas being configured to atomize the spray fluid;
a pair of spray fluid flow passages configured to supply the spray fluid to the mixing chamber;
a spray medium flow passage configured to supply the spray medium to the mixing chamber; and
one or more outlet holes configured to spray the fluid mixture to the outside; wherein
the mixing chamber includes at least one middle ejection hole configured to spray the spray fluid to the mixing chamber,
the pair of spray fluid flow passages is connected to each other on a downstream side of a flow of the spray fluid,
the at least one middle ejection hole is arranged at a joining section where the pair of spray fluid flow passages is connected to each other,
the spray fluid configured to flow through the pair of spray fluid flow passages is configured to join with each other at the joining section of the pair of spray fluid flow passages, and is configured to be sprayed from the at least one middle ejection hole, the spray medium is configured to flow along a side partition wall of the mixing chamber and along an axial direction of the atomizer, the mixing chamber includes a groove that communicates with the at least one middle ejection hole, and the groove is arranged to extend in a direction perpendicular to a direction along which the pair of spray fluid flow passages is connected to each other.

2. The atomizer according to claim 1 further comprising:

a plurality of the outlet holes.

3. The atomizer according to claim 1, wherein the mixing chamber includes one or more outlets of the spray medium flow passage, the atomizer includes at least one of: i) the at least one middle ejection hole including a plurality of middle ejection holes, and ii) the one or more outlets including a plurality of outlets of the spray medium flow passage, and when the atomizer includes a plurality of the middle ejection holes, the atomizer includes a plurality of the pair of spray fluid flow passages and each middle ejection hole of the plurality of middle ejection holes is arranged at each joining section where the pair of spray fluid flow passages is connected to each other.

4. The atomizer according to claim 1, wherein the mixing chamber includes two outlets of the spray medium flow passage, and the two outlets of the spray medium flow passage are arranged on opposite sides of the groove in a direction perpendicular to an extending direction of the groove.

5. The atomizer according to claim 1, wherein the mixing chamber includes an outlet of the spray medium flow passage, and the outlet of the spray medium flow passage is configured in an annular shape to surround the at least one middle ejection hole along a wall surface of the mixing chamber extending in an axial direction of the atomizer.

6. The atomizer according to claim 1, wherein a cross-section of the mixing chamber perpendicular to an axial direction of the atomizer is configured to decrease in a direction toward downstream of a flow of the fluid mixture.

7. A combustion device, comprising:

an atomizer according to claim 1, wherein the atomizer is configured to be supplied with a liquid fuel as the spray fluid and is configured to be supplied with air or steam as the spray medium, and the atomizer is configured to spray the fluid mixture of the spray fluid and the spray medium.

8. A gas turbine plant, comprising:

a gas turbine combustor configured to combust a liquid fuel;

a fuel tank configured to store the liquid fuel;

a compressor configured to compress air to form combustion air and configured to supply the combustion air to the gas turbine combustor; and a turbine configured to be driven by a combustion gas, the gas turbine combustor being configured to generate the combustion gas, wherein the gas turbine combustor is a combustion device including the atomizer according to claim 7, and the atomizer is configured to be supplied with the liquid fuel stored in the fuel tank and the atomizer is configured to spray the liquid fuel to the gas turbine combustor.

9. A combustion device, comprising:

an atomizer according to claim 1, wherein a liquid fuel and combustion air are configured to be mixed and combusted with the liquid fuel being sprayed from the atomizer, the atomizer is configured to be supplied with the liquid fuel as the spray fluid and is configured to be supplied with a part of the combustion air as the spray medium, and the atomizer is configured to spray the fluid mixture of the spray fluid and the spray medium.

10. A gas turbine plant, comprising:

a gas turbine combustor configured to combust a liquid fuel;

a fuel tank configured to store the liquid fuel;

a compressor configured to compress air to form combustion air and configured to supply the combustion air to the gas turbine combustor; and a turbine configured to be driven by a combustion gas, the gas turbine combustor being configured to generate the combustion gas, wherein the gas turbine combustor is a combustion device including the atomizer according to claim 9, and the atomizer is configured to be supplied with the liquid fuel stored in the fuel tank and the atomizer is configured to spray the liquid fuel to the gas turbine combustor.

* * * * *